June 15, 1943.  W. H. CONNELLY  2,322,113
CARD GAME
Filed Oct. 29, 1940
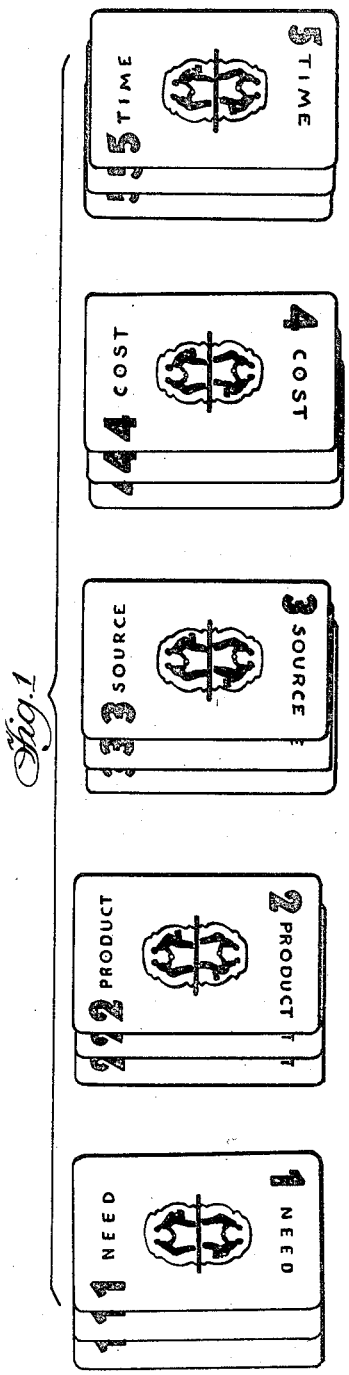
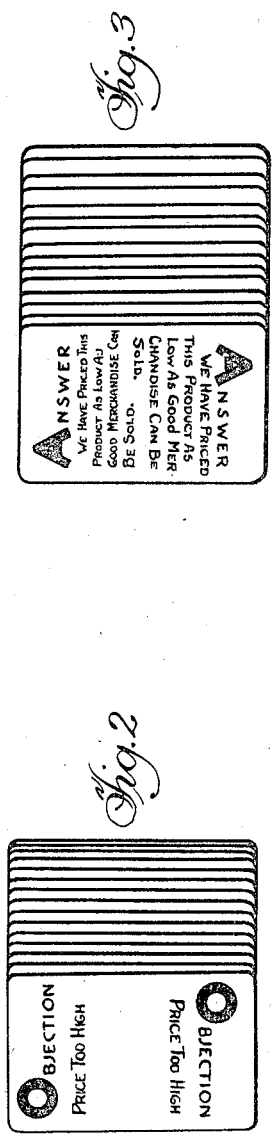
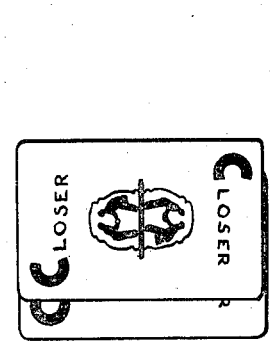
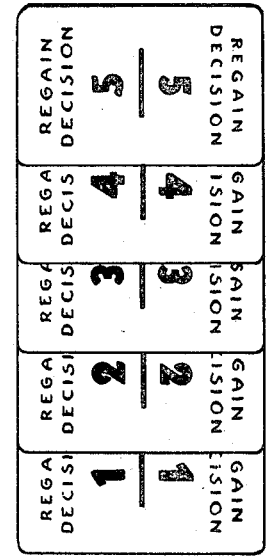
INVENTOR.
Will H. Connelly,
BY Parkinson + Lane
Attys.
Witness:
Chas. R. Loursh.

Patented June 15, 1943

2,322,113

UNITED STATES PATENT OFFICE 2,322,113

CARD GAME

Will H. Connelly, Park Ridge, Ill.

Application October 29, 1940, Serial No. 363,334

3 Claims. (Cl. 273—152)

The invention relates to a card game and more particularly a game which is interesting and entertaining and will also instruct a salesman in the selling of his product (or service).

Another object is to provide a game whereby products may be advertised or publicized with the end in view of educating members of the public who play the game in the advantages of a particular product (or service).

The game is based upon the theory advanced by the La Salle Extension University that whenever a buyer buys anything he makes five buying decisions as follows: (1) the need; (2) the product (or service) to satisfy the need; (3) the source of the purchase; (4) the cost; (5) the time.

In other words, you purchase a product as the result of making these five decisions:

1. The product is necessary or most desirable for you or your family.
2. The particular product would satisfy the need.
3. The X company is the best dealer from whom to purchase such product.
4. The price and terms make the particular product the best buy for your money.
5. The present is the best time to buy the product.

These decisions are rarely made at the same time. Possibly a prospective purchaser has made one or more of the decisions, but needs to be sold on the others. The salesman of the product must not waste time on influencing the buyer to make decisions he has already made but must concentrate on the decisions not yet reached. From the preliminary conversation and from the objections advanced by the buyer an educated salesman can easily figure out what decisions have been made and what decisions have not been made. It is the object of this game to educate the salesman so that he can easily and quickly determine from the objections advanced by the prospective buyer what decisions have not been made so that he will know on what to concentrate and in addition to instruct the salesman in the proper answers to make to such objections.

For example, the buyer might say to the salesman, "your price is too high." The salesman then must analyze the objection and ask himself, "Does the objection involve the need, the product, the source, the cost or the time?" This objection the seller knows immediately is to the cost and he knows that he must win that decision if he is going to make the sale. Occasionally a decision will be won by the seller only to be lost later on as for instance when someone else involved in the purchase enters the scene and objects to the particular purchase with the result that the prospective buyer changes his mind. In this case it is necessary to regain this decision.

The present invention will provide pleasure and compensation as well as make it easy for a salesman to think of selling his products or service in terms of these five buying decisions and help him to become familiar with the important objections which stand in the way of his sale as well to to suggest answers by which these suggestions may be successfully overcome. It will furthermore educate a prospective purchaser in the quality of the manufacturer's product as well as get him interested in such a product so that it combines the teaching of salesmanship with publicity of a particular product.

In the drawing:

Fig. 1 is a face or plan view of such set of each series of the five buying decision cards.

Fig. 2 is a face view of the set of fifteen objection cards, three for each decision.

Fig. 3 is a face view of the set of answer cards there being one answer to each objection.

Fig. 4 is a face view of the set of the five regain decision cards.

Fig. 5 is a face view of the two closer cards.

In the embodiment shown there are fifty-two cards in the deck, fifteen buying decision cards, fifteen objection cards, fifteen answer cards, five regain decision cards and two closer cards, but different numbers of each set of cards may be used if desired.

The cards shown in the drawing are complete with the exception of the objection and answer cards, all of which are different and only the first of which discloses the matter printed on them. The reason for not showing the printed matter on the other cards is that the objections and answers to different products are not the same. However, there are numerous objections and answers which would generally apply to any product. One of these is shown on the drawing and the others are as follows:

Obj.—Obligated to buy from a friend
Ans.—Business profits mean more to you than business friendship Obj.—Satisfied with our present connection
Ans.—Give us a trial and see how much more service your money will buy.

Obj.—I want to think it over
Ans.—Let's think it over right now while the facts are fresh in your mind.

Obj.—I can't decide now. See me in 30 days.
Ans.—This is an easy decision to make. Let me review my proposition briefly In practice each deck will be supplied with one or two reference sheets showing the objections and their correct answers.

The object of the game is to get one of each of the five buying decisions on the table in front of you. A buying decision is won in three ways, first by a buying decision card and second by pairing an objection and an answer to a buying decision. For example, decision four may be won by drawing one of the cost decision cards (No. 4) or by drawing one of the cards bearing an objection to cost and the card bearing the answer to that objection. When you gain a buying decision by pairing an objection and answer you must have the specific answer to that objection as shown on the reference sheet. No other answer no matter how closely related it may be to the objection can be used. A player pairing an objection and an incorrect answer loses the game.

The third method of winning a decision is to draw a closer card which is "wild" and may be used to win any one of the five buying decisions.

The game is played as follows:

A dealer is chosen in any manner as by cutting, who shuffles the cards and deals them one to each player until each player has five cards. The next card is placed face up in the center of the table and comprises the first card in the discard pile referred to hereafter. The balance of the deck is placed beside the discard, face down, as in rummy. The player on the left of the dealer plays first. He places on the table before him, face up, any buying decision card or cards and any regain decision card or cards which he has in his hand. If, however, the player has more than one of the same buying decision cards in his hand he places one on the table and retains one in his hand. If a regain decision card corresponds to the number of one of the buying decisions the player must on his first play discard both the buying decision and the corresponding regain decision cards.

If a player fails to put a regain decision card on the table in front of him he loses that game. The player then draws either the card from the top of the deck or the card in the discard pile which is facing up next to the deck. If the drawn card should be a buying decision or regain decision card he must put it on the table in front of him. If he should draw an objection card he must hold it if it relates to a decision not yet gained. If the objection card involves a buying decision already gained it may either be held or discarded. If he should have the answer card to the objection card he will place the two together on the table before him to indicate a gained decision. If the card should be an answer card he may hold it or discard it as he sees fit regardless of whether the answer relates to a buying decision not yet gained or won.

If the player draws a "wild" closer card he may either hold it in his hand or place it on the table in front of him to win any one of the buying decisions. When a closer card is placed on the table the player must declare which buying decision he is using it for and if he should subsequently draw that buying decision he cannot use it in place of the closer card and use the latter to gain another missing decision.

After drawing a card from the deck or discard pile the player must discard a card from his hand if possible. The only circumstances under which a player can avoid discarding occurs when he is holding only objection cards relating to decisions which he has not gained. If he is holding a number of such objection cards and a closer card he must lay the closer card on the table declaring which buying decision it is used for and then discard the objection card to this buying decision. In other words, a player cannot hold a closer card in his hand and fail to make a discard.

Occasionally a discard will cause a player to run out of cards in the middle of the game. If this occurs he simply waits until his next turn and draws another card from either the deck or discard pile. The player may win the game and still have cards in his hand. This does not affect the result.

The play continues clockwise until a player wins the game by obtaining all five buying decisions. The remaining players may go on with the game to see who comes in second, third, etc.

The game is intended for two or more persons but may be played as two handed solitaire if desired.

It is at once apparent that to be skillful at the game the player must know the answer to each objection and must also know to which buying decision the objections and answers refer. Consequently playing the game will encourage a salesman to study and understand the objections and answers and hence increase his efficiency. The game will also afford entertainment to the players and may be sold or given away to the general public and thereby assist a manufacturer in publicizing his product and to acquaint the public with its advantages as well as to suggest to the public the sale of the product. While particular groups of specific cards have been shown it should be understood that the groups, or any of the cards in any of the groups, may be varied and that some may be omitted and others added and the particular group or specific information on the cards and arrangement thereof are susceptible of modification or change without departing from the spirit of the invention.

While the embodiment shown relates to buying decisions on products, the invention also relates to similar decisions on business, professional, or other services, and in fact to any objective to which there are obstacles which may be solved.

Having thus disclosed my invention, I claim:

1. In a card game of the character described, a deck of cards comprising five sets of cards bearing decisions normally made before a product is purchased, the winning of a set of such decisions being the object of the game, a set of cards bearing objections to decisions relating to the purchase of the product, a set of cards each bearing an answer to one of said objections, and a set of wild cards each permitting the holder to win a decision.

2. In a card game of the character described, a deck of cards comprising a set of fifteen cards bearing five decisions normally made before an article is purchased, a set of fifteen cards bearing objections to such decisions, a set of fifteen cards each bearing an answer to one objection, a set of five regain decision cards and a set of two closer cards.

3. In a card game of the character described, a deck of cards containing a group of fifteen cards, three of each bearing a decision normally made before a product is purchased, a group of fifteen cards bearing objections to the sale of a particular product, a group of fifteen cards each bearing an answer to a particular objection, a group of five penalty cards each bearing a requirement to regain a particular decision and a group of two wild cards permitting a player to gain any decision.

WILL H. CONNELLY.